United States Patent [19]

Katoh

[11] 3,888,432

[45] June 10, 1975

[54] RECORDING AND/OR REPRODUCING APPARATUS HAVING A REEL DISC DEVICE

[75] Inventor: Hiroshi Katoh, Yokohama Japan

[73] Assignee: Victor Company of Japan, Ltd., Yokohama, Kanagawa, Japan

[22] Filed: Aug. 8, 1973

[21] Appl. No.: 386,714

[30] Foreign Application Priority Data

| | | |
|---|---|---|
| Aug. 10, 1972 | Japan | 47-79514 |
| Aug. 18, 1972 | Japan | 47-96115 |
| Aug. 25, 1972 | Japan | 47-98433 |

[52] U.S. Cl. ................ 242/201; 242/199; 242/207

[51] Int. Cl. ........................................ G11b 15/30

[58] Field of Search .......... 242/201, 199, 202, 200, 242/203, 204, 198, 205, 197, 206, 207, 208, 209, 210

[56] References Cited

UNITED STATES PATENTS

| | | | |
|---|---|---|---|
| 1,377,112 | 5/1921 | Boylan | 242/207 |
| 2,568,790 | 9/1951 | Collins | 242/207 |
| 3,472,464 | 10/1969 | Morimoto et al. | 242/208 |

*Primary Examiner*—George F. Mautz

[57] ABSTRACT

A recording and/or reproducing apparatus has a reel disc device of parallel double-clutch type, suitable for driving a take-up reel. This parallel double-clutch type reel disc device comprises an upper reel disc part for engaging a take-up reel and rotating it in a direction to take up a magnetic recording tape. An intermediate reel disc part is disposed below the upper reel disc part and fitted rotatably and axially slidably on a shaft-form member formed integrally with the upper reel disc part, rotating power, from a driving means, turns the intermediate reel disc in the take-up direction. A lower reel disc part is disposed below the intermediate reel disc part and fitted on the shaft-form member to slide axially thereon, but to rotate unitarily therewith. First and second friction clutches are interposed respectively between the upper reel disc part and the intermediate reel disc part and between the intermediate and lower reel disc parts. The rotation of the intermediate reel, as driven at the time of recording or reproducing, is transmitted simultaneously by way of a first rotation transmission path through the first friction clutch means and a second rotation transmission path through the second friction clutch means, the lower reel disc part, and the shaft-form member to the upper reel disc part. The first and second rotation transmission paths have a mutually parallel relationship.

4 Claims, 7 Drawing Figures

RECORDING AND/OR REPRODUCING APPARATUS HAVING A REEL DISC DEVICE

BACKGROUND OF THE INVENTION

This invention relates generally to a tape recording and/or reproducing apparatus and more particularly to a recording/reproducing apparatus having an improved reel disc device.

More specifically, the present invention relates to a recording/reproducing apparatus having a parallel double-clutch type reel disc device. The clutch imparts the rotational power of a reel disc part to a reel disc main structure in engagement with a take-up reel. The reel disc part is energized by a rotational power responsive to a motive power means source such as a driving roller which is engaged at the time of the recording/reproducing operation. The clutch forms a pair of rotation transmission paths with a mutually parallel arrangement, and which is capable of imparting a relatively large rotational torque over a long period without fluctuation to the reel disc main structure.

In general, in an audio tape recorder for home use, the tape path is relatively simple, at the time of recording or reproducing. Moreover, only a small tape tension may be applied to the magnetic tape. Accordingly, a relatively low value of the tape take-up torque imparted to the take-up reel is sufficient. For this reason, the take-up reel disc device includes an upper reel disc part and a lower reel disc part which are supported to rotate independently of each other on a reel shaft fixed to the chassis. Spring force the two reel disc parts to press together through a relatively frictional member, such as felt. The rotational power imparted to the lower reel disc, by the driving roller pressed thereagainst, is transmitted to the upper reel disc part which is engaged with the take-up reel through the frictional member.

On the other hand, in an apparatus for magnetically recording and reproducing video signals, a wide magnetic tape is used. This wide tape forms a complicated tape path which is wrapped around and over a specific angular expanse of a guide drum, having magnetic heads rotating at high speed. In an apparatus of this character, there is a necessity for imparting a considerably large torque, in the tape take-up direction, to the take-up reel. When a reel disc device, as described above, is applied to a recording/reproducing apparatus of this character, it is necessary for a spring force to press the two reel disc parts together.

However, since the spring for so pressing the two reel discs and the reel disc parts themselves do not rotate unitarily, noise is generated between the spring and the reel disc parts at the time of operation of the reel disc device. Furthermore, the spring undergoes a change in its constant with the elapse of time, its spring force tends to vary, whereby the torque imparted to the upper reel disc part varies away from its initial value. Another drawback of this known apparatus is that, there is a relatively large pressing force of the frictional member and the reel disc part transmitting rotation, while producing slippage. A large quantity of heat is generated at the pressing surfaces. The properties of the frictional member or the reel disc parts undergo change, whereby the coefficient of friction therebetween differs from the initial value.

Furthermore, in a take-up reel disc device of a different type which has been proposed for application in a video signal, magnetic recording/reproducing apparatus, an intermediate reel disc part and a lower reel disc part are provided in a mutually independently rotatably manner, with respect to a bearing sleeve which is rotatable unitarily with an upper reel disc part. Frictional members are interposed between these reel disc parts, which are adapted to be pressed together. Thus, the entire mechanism is a reel disc device of series double-clutch type.

In the operation of this proposed reel disc device at the time of recording or reproducing, the rotational power applied to the lower reel disc part is transmitted through the lower frictional member to the intermediate reel disc part and further by way of the upper frictional member to the upper reel disc part to cause a rotation in the tape take-up direction. At this time, slippage occurs between the lower frictional member and the intermediate and lower reel disc parts which are in pressing contact on the upper and lower surfaces of this frictional member. The intermediate reel disc part rotates at a rotational speed which is different from that of the lower reel disc part. However slippage does not occur between the upper frictional member and the upper and intermediate reel disc parts. The intermediate reel disc part rotates unitarily with the upper reel disc part.

In this proposed reel disc device, also, slippage tends to occur between a spring for displacing the reel disc parts in the mutually pressing direction and the reel disc parts contacting the spring. The same problem is encountered as in the first described reel disc device. A further difficulty is that the rotational power applied to the lower reel disc part is, in mechanism effect, transmitted to the upper reel disc through a single-clutch mechanisn at the lower frictional member. For this reason, the same problem, as described in the first described device, still remains unsolved.

SUMMARY OF THE INVENTION

Accordingly, it is a general object of the present invention to provide a recording/reproducing apparatus having a new and useful reel disc device, in which the above described difficulties are overcome.

A specific object of the invention is to provide recording/reproducing apparatus having a parallel double-clutch type, reel disc device. In this parallel double-clutch type, reel disc device, an intermediate reel disc part rotates independently of an upper reel disc part, with which a lower reel disc part rotates unitarily. Rotational power applied to the intermediate reel disc part is transmitted by way of a first driving power transmission path including an upper frictional member and a second driving power transmission path. This causes the lower reel disc part to rotate by way of a lower frictional member simultaneously with the upper reel disc part engaged with a reel. By the application of the device of the present invention, it is possible to transmit a relatively large torque to the upper reel disc part without resorting to a large pressing force applied to the frictional members and the reel disc parts. Thus, there is less generation of frictional heat between the reel disc parts and the frictional members.

Another object of the invention is to provide a recording/reproducing apparatus having a reel disc device in which a spring member for imparting clamping force to the frictional members through their adjacent reel disc parts is adapted to rotate unitarily with the lower reel disc part rotated unitarily with the upper reel disc part, slippage between the contacting parts of the spring member and the lower reel disc part. By this feature of the invention, changes in the spring member are prevented with the elapse of time.

Still another object of the invention is to provide a recording/reproducing apparatus having a reel disc device adapted to change over between high torque and low torque operation in the tape take-up direction with respect to the reel disc main structure on which the take-up reel is mounted. By this feature of the invention, it is possible to form a wound tape roll without winding irregularities and deviations irrespective of whether the cassette is for use in portable type apparatus or stationary apparatus. Particularly in a cassette for portable type apparatus, it is possible to limit the waste of power consumed by the recording/reproducing apparatus.

A further object of the invention is to provide a recording/reproducing apparatus having a reel disc device in which the type of loaded cassette is discriminatively detected, and an appropriate torque is selectively imparted to the take-up reel disc in accordance with the type of cassette mounted thereon.

Other objects and further features of the present invention will be apparent from the following detailed description with respect to preferred embodiments of the invention when read in conjunction with the accompanying drawings.

DETAILED DESCRIPTION

For a full understanding of the present invention, one example of tape loading and unloading operations of a recording and/or reproducing apparatus which carries out automatic tape loading operation, and to which the reel disc device constituting an essential part of the invention is applicable, will first be described with reference to FIGS. 1, 2 and 3.

Figure 4:
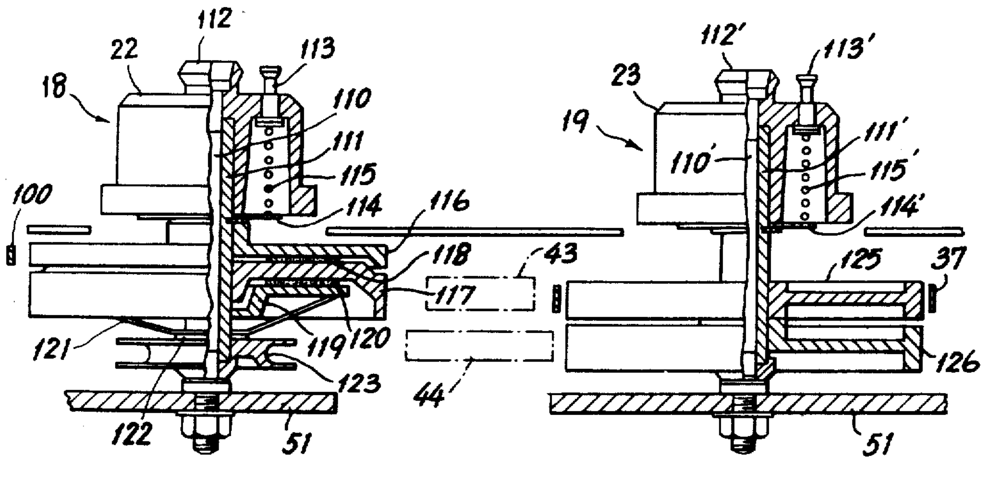
FIG. 4 is an elevation view, partly in vertical section, showing one embodiment of a reel disc device incorporated in the recording/reproducing apparatus illustrated in FIG. 1 and constituting an essential part of the apparatus of the present invention.

A tape cassette 10 contains a tape supply side tape roll 11 and a tape take-up side tape roll 12. Within the tape cassette 10, there are tape guide pins 13, 14 and 15, whereby a magnetic tape 16 drawn out from the tape supply side roll 11 is guided by the guide pin 13, passes by the front surface of the cassette, and, passing between the pins 14 and 15, reaches the tape take-up side roll 12. The cassette 10 has a cut out opening 17 at its forward or innermost surface and bottom surface with a cut out opening 17. A shutter cover (not shown) is opened by the insertion of the cassette into a loaded position within the apparatus. The shutter protects the magnetic tape 16 with the cassette when it is not being used. When the cassette 10 is being mounted on the tape supply reel disc 19 and the tape take-up reel disc 18 is as shown in FIG. 1, this shutter cover is held open. A tension pole 20 and a guide pole 21 are inserted within the cassette opening 17. The supply reel disc device 18 is of known construction wherein a reel disc main structure 23 is mounted on the upper surface thereof, with a friction material interposed therebetween. The take-up reel disc device 19 constitutes an essential part of the apparatus of the invention and has an organization as shown in FIG. 4. The rotation of a second reel disc part 117 is driven by a driving roller 43 as described hereinafter. This rotational energy is transmitted by way of different power transmission paths, respectively having clutch mechanisms, to a reel disc main structure 22 with a rotation in the take-up direction. As shown in FIG. 1, the two reel disc devices 18 and 19 are both in a freely rotatable state.

First, the loading operation carried out by play control operation or video-audio recording control operation will be described. For play operation, a play control lever 24 is swung to the right (counterclockwise as viewed from above) to the lock position indicated in FIG. 2. For video-audio recording operation, a video-audio recording control button 106*c* is pushed in, and at the same time the control lever 24 is turned in the same manner as for play operation.

Ths manipulation of the control lever 24 causes a connector 25 to also rotate similarly in the counterclockwise direction. A lock lever 28 is rotatably held on a holder 27 fixedly mounted on a sub-chassis 26. Lever 28 is rotated in the clockwise direction against the force of a spring 30 by a connecting rod 29 linking one end of the lock lever 28 to the connector 25. Consequently, a supply-side tension lever 31 is rotatably held in the lower side of the holder 27. Lever 31 is released from engagement by an engagement pin 32 embeddedly fixed to the lower side of the other end of the lock lever 28 and is thereby turned clockwise by the tension force of a spring 34 stretched between the tension lever 31 and a skew control lever 33.

As a result of this rotation of the tension lever 31, the aforementioned tension pole 20 embeddedly secured to the other end of the tension lever 31 is extracted from the interior of the cassette 10 via the opening 17. As it thus moves out, pole 20 intercepts the magnetic tape 16 and draws it out of the cassette. Furthermore, as another result of the rotating of the tension lever 31, a brake band 37 is tightened. Band 37 encircles the reel disk 19 and is connected at its two ends, respectively to a pin 35 fixed to the lever 31 and to an anchor member 36 on the subchassis 26 is sightened, and a braking force for imparting a back tension to the magnetic tape 16 paid out from the tape roll 11, with braking applied to the supply-side reel disc 19. The above mentioned skew control lever 33 is actuated by means of a knob 38 and is locked in a specific position.

As another result of the above mentioned manipulation of play control lever 24, an electrical circuit is closed to a capstan motor 40 and a head motor 41.

These motors 40 and 41 start to rotate. The rotation of the motor 40 is transmitted through a belt (not shown) to rotate an intermediate pulley 42 provided integrally with a two-stage pulley. This pulley rotates in the clockwise direction. Further, motor 40 acts through a belt (not shown) to rotate in the clockwise direction a driver roller 43 and a rewind roller 44 (integrally formed) and a flywheel 46 connected to a capstan 45. At this time, the drive roller 43 is pressed into contact with the second reel disc part 117 of the take-up reel disc 18. To the reel disc main structure 22, a relatively large torque is imparted in the tape take-up direction, as described hereinafter.

The rotation of the head motor 41 is transmitted through a pulley 47, a belt 48, and a pulley 49 to cause an upper guide drum 50*a* of the guide drum 50 to rotate clockwise at high speed. As shown in FIG. 3, the guide drum 50 comprises a lower guide drum 50*b* fixed to the chassis 51 of the apparatus. The upper guide drum 50*a* has a rotating video head (not shown) therein. Drum 50*a* is rotatably supported at a position which is slightly separated from the lower guide drum 50*b* and is inclined so that its part confronting an erasing head 102 is at a low position.

As still another result of the aforementioned movement of the play control lever 24, a revolving ring driving mechanism (not shown) which has been in its unoperative state is changed over to the loading state. A clockwise rotation is transmitted to a driving roller 52 pressed against the inner peripheral surface of a revolving ring 58. As a result, the revolving ring 58 starts to rotate clockwise from its position indicated in FIG. 1.

The revolving ring 58 is revolvably held with a specific angle of inclination, relative to the chassis 51, by guide rollers 70*a*, 70*b* and 70*c*. This revolving ring 58 has V-shaped notches 71 and 72 and a U-shaped cutout 74 at specific points on its outer rim. Ring 58 is limited in its revolution at a position where a roller 75 fits into the notch 71. A first arm 76 and a second arm 77 are rotatably connected by a shaft 78. The near end of the first arm 76 is rotatably supported on a pin 80 fixed to a bracket 79 crossing the ring 58 in the side view of FIG. 3. The second arm 77 supports the aforementioned guide pole 21 fixed to upper part of its distant end and a pin 81 fixed to the lower side thereof. The pin 81 extends to a position for fitting into the cutout 74 and is prevented from disengaging from the cutout 74 by an arcuate guide surface 79*a* of the bracket 79.

The revolving ring 58 has on its upper surface guide pins 82*a*, 82*b* and 82*c* and a pivot pin 83 fixed thereto. A pinch roller supporting lever 84 is pivoted on the pin 83 and is urged to turn in the counterclockwise direction responsive to a torsion spring, but is limited from thus turning at the position indicated in FIG. 1. This lever 84 has a tape guide pole 85 at its distal end and at a pinch roller 86 approximately its middle part.

As the revolving ring 58 begins to revolve, an approximately L-shaped lever 87 is also rotated clockwise against the force of a spring 88. Lever 87 holds the aforementioned roller 75 at the end of one of its arms. Thus, the roller 75 is disengaged from the notch 71 and pressed against the outer peripheral surface of the ring 58. The pin 81 fitted in the cutout 74 moves together with the revolving of the ring 58, as it is guided by the guide surface 79*a*. Consequently, the first arm 76 is rotated in the counterclockwise direction relative to the pin 80, while the second arm 77 is rotated in the clockwise direction relative to the shaft 78. As the ring 58 revolves further, the lower end portion of the pin 81 is guided by the guide surface 79*a* pin 81 enters the arcuate slot 89 formed in the chassis 51, along the outer periphery of the revolving ring 58 and through the opening of the slot. The pin 81 is now guided by the side walls of the slot 89 to move together with the revolution of the ring 58, separating from the above mentioned guide surface 79*a*.

Figure 1:
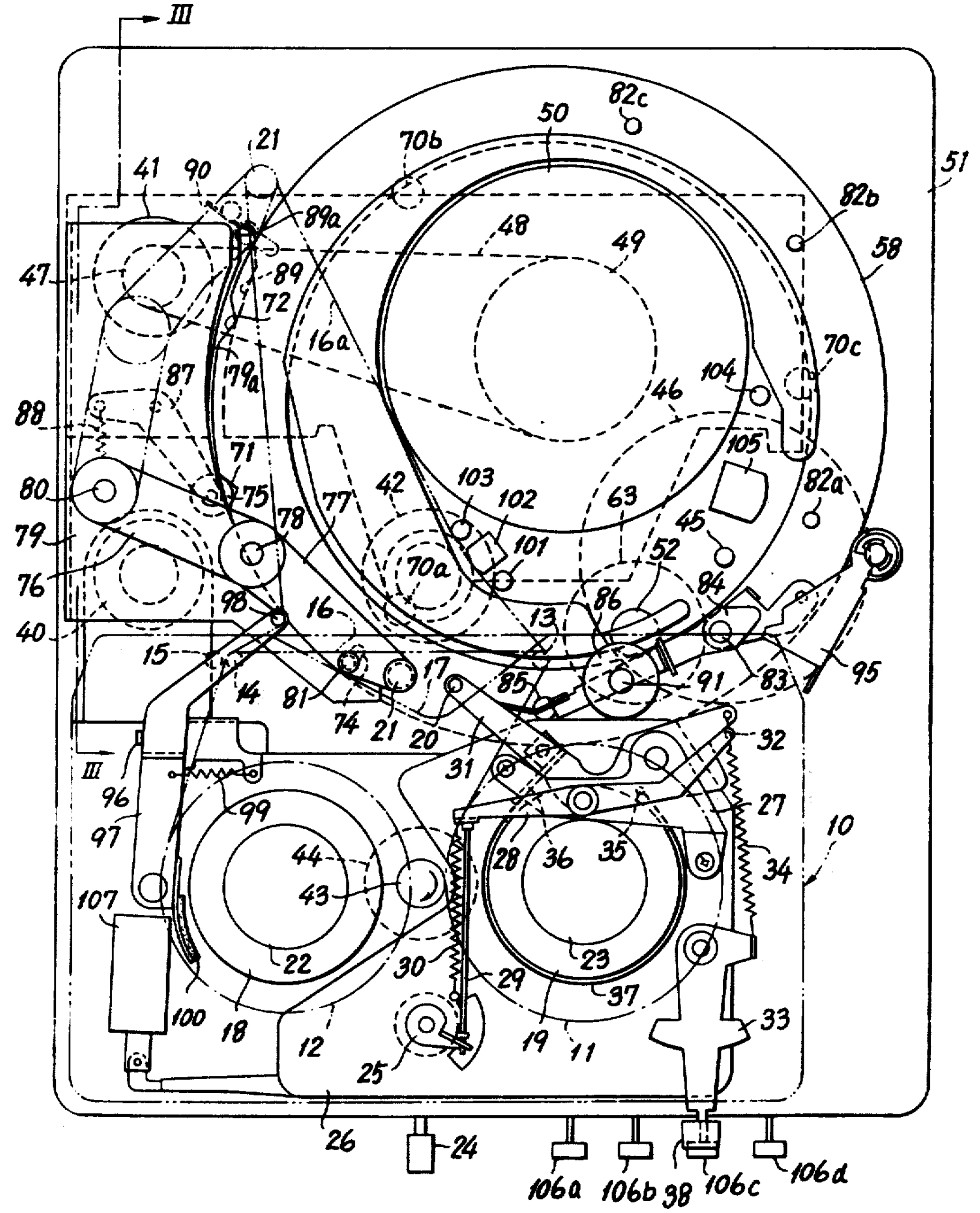
FIG. 1 is a plan view showing one example ofo a recording/reproducing apparatus having an improved reel disc device according to the invention shown in the state prior to loading of a tape thereinto.

The revolving ring 58 revolves until the cutout 74 reaches the position indicated by a two-dot chain line in FIG. 1. The pin 81 is guided by the bent slot part 89*a* of the arcuate slot 89 and is moved outward in the radial direction of the ring 58. The pin 81 thereby disengages from the open end of the cutout 74 and fits into the inner part of the bent slot part, pressing against the spring force of a torsion spring 90. When the ring 58 further revolves slightly from the above mentioned position, the pin 81 is completely extracted out of the cutout 74 and is pressed against the outer peripheral edge of the ring 58 responsive to the torsion spring 90. Pin 81 is locked within the bent slot part 89*a*. During the second half portion of the revolution of the revolving ring 58 (up to the above mentioned position), the first arm 76 is rotated clockwise, while the second arm 77 is rotated counterclockwise and placed in the position indicated by a two-dot chain line in FIG. 1.

The first and second arms 76 and 77 change their folded state as they are rotated counterclockwise with respect to the shaft 80, interrelatedly with above described revolution of the revolving ring 58. The guide pole 21 is fixed to the upper part of the distal end of the second arm 77. As it is extracted through the opening 17 of the cassette 10, pole 21 intercepts and engages the magnetic tape 16 uniformly over its entire width. Then, as the revolving ring 58 revolves clockwise, pole 21 draws the tape out of the cassette 10 in the horizontal direction. When the pin 81 is positioned within the bent slot part 89*a*, a tape loop 16*a* of approximately triangular shape is formed in the plane of the cassette 10 as indicated by two-dot chain line in FIG. 1.

Thereafter, the revolving ring 58 continues revolving by itself. Ring 58 is orientated with an inclination such tht its lowermost position confronts the lower side position of the cassette as shown in FIG. 3. The tape guide pole 85, the pinch roller 86, the guide pins 82*a*, 82*b* and 82*c*, and like parts enter the above mentioned triangular tape loop 16*a* from below and rise as the ring 58 revolves. Consequently, the leading tape guide pole 85 comes out of the tape loop 16*a*, intercepts the magnetic tape 16, and pulls it around as the ring 58 revolves, thus causing it to be wrapped around the cylindrical peripheral surface of the guide drum 50.

When the revolving ring 58 causes the tape guide pole 85, to engage the magnetic tape 16, it revolves, pulling the tape around along the peripheral surface of the guide drum 50 as described above. Guide pole 85 reaches a point slightly short of the final revolution position indicated in FIG. 2. The revolving ring driving mechanism is changed over from the loading state to the unoperative state when a part thereof contacts and engages a projection (not shown) on the lower surface of the ring 58. The driving roller 52 stops rotating, and, similarly, the revolving ring 58 similarly stops its clockwise revolution.

Figure 2:
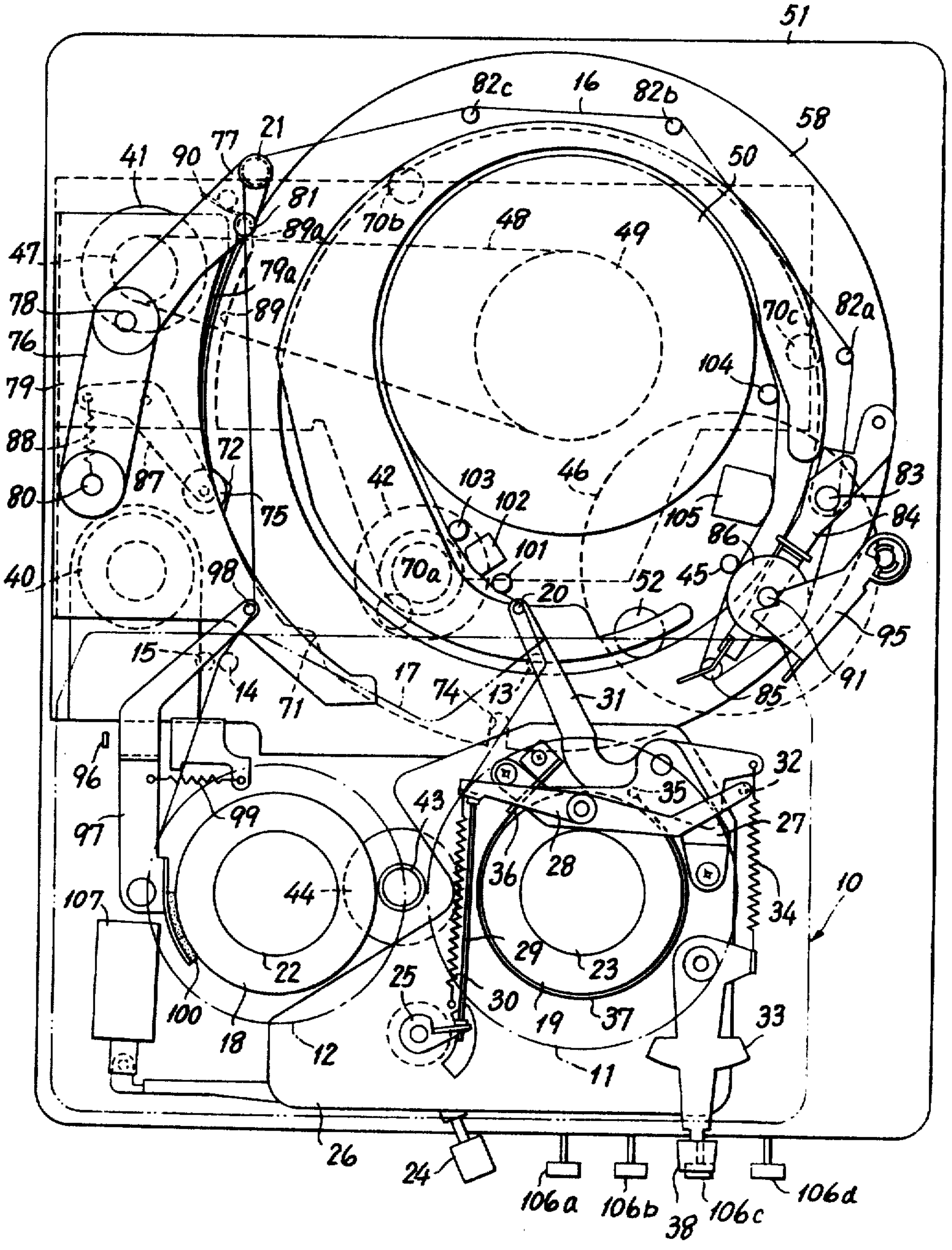
FIG. 2 is a plan view of the apparatus shown in FIG. 1 shown in the state after the loading of a tape thereinto.
Figure 3:
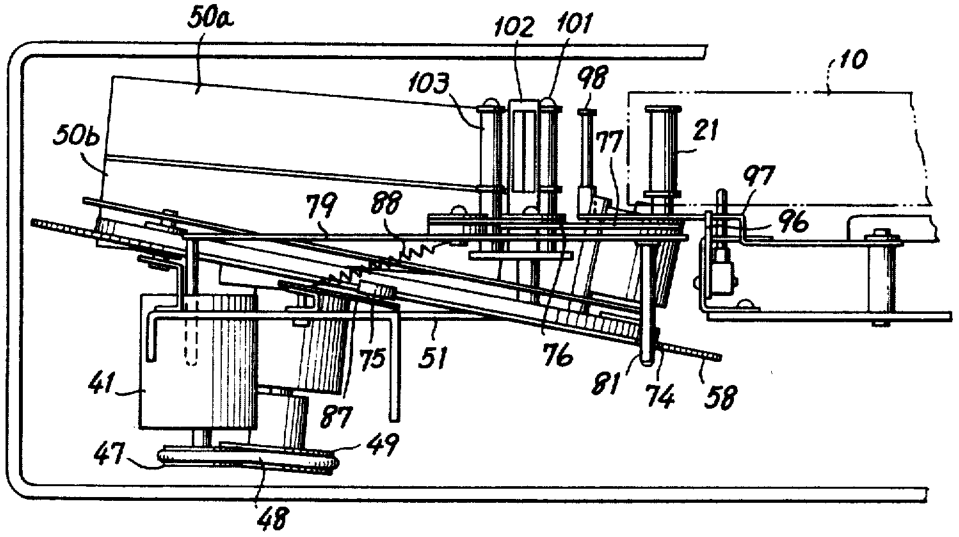
FIG. 3 is an elevation view in vertical section taken along the line III—III in FIG. 1, as viewed in the arrow direction.

The revolving ring 58 is no longer supplied with driving power, and is limited in revolution at the position indicated in FIG. 2 where the roller 75 pressing against the outer periphery of the revolving ring engages the notch 72. As a result of the revolution of the ring 58 to its final position, a microswitch (not shown) is closed. The apparatus is thereby changed over to the recording or reproducing operational mode. In addition, a solenoid (not shown) operates to actuate a pinch roller pressing lever 95 in clockwise rotation. The pinch roller 86 is engaged by the pinch roller shaft 91 and rotates together with the supporting lever 84, thereby pressing the tape 16 against the capstan 45. Consequently, the tape 16 is clamped between the pinch roller 86 and the already rotating capstan 45, thereby beginning to travel under driving power.

Furthermore, as another result of the rotation of the pressing lever 95 to the above mentioned operative position, this rotation is transmitted through a rod (not shown) to move a stop member 96 toward the left, thereby to release a take-up side tension lever 97. Consequently, the tension lever 97 rotates slightly counterclockwise against the force of a spring 99. The tape tension is thereby detected by a tension pole 98 fixed on one end of the tension lever. At the same time, a brake shoe 100 of the other end presses against a first reel disc part 116 of the take-up reel disc device 18. A tension servomechanism on the take-up side is thus rendered operative.

The magnetic tape 16 is guided by the guide pin 13 from the tape supply roll 11 with the cassette 10 and paid out of the cassette. When the apparatus is in the recording or reproducing mode, a constant tape tension is maintained on its supply side responsive to the tension pole 20 operating cooperatively with the brake band 37 tape 16 is guided by a guide pole 101 and drawn across a full-erasing head 102, where, for recording, erasure is carried out across the full width of the tape. The tape is then wrapped in a helical path around the peripheral surface of the guide drum 50, over a specific angular range limited by guide poles 103 and 104. Recording or reproducing of video signals is carried out on the tape by a video head (not shown). The tape is further drawn across a head block 105 disposed with an inclination, where recording or reproducing of audio and control signals is carried out. The tape is then clamped between and driven by the capstan 45 and the pinch roller 86. The tape advancing direction is reversed by the tape guide pole 85. The tape is then guided to guide pins 82*a*, 82*b* and 82*c* on the opposite side of the pinch roller 86. After passing by the guide pole 21, which is being locked, the tape is maintained at a constant tape tension on the take-up side by the tension pole 98 as it reenters the cassette 10, in which the tape is guided by the guide pin 14 to reach the take-up tape roll 12. A torque urges roll 12 to rotate in the tape take-up direction.

The unloading operation carried out by a stopping control of the above-mentioned apparatus is as follows. At the time of the stop control, a stop button 106*b* is pushed. A solenoid 107 operates, and the control lever 24 is released from its locked state and is returned to its original position indicated in FIG. 1. As a result of the return of the control lever 24, the various means operated at the time of loading operate opposite in directions to return to their respective original positions in sequence which is reverse to that which occurs at the time of loading operation. The apparatus is changed over from the state shown in FIG. 2 to the orginal state shown in FIG. 1. The magnetic tape 16 which has been drawn out of the cassette 10 is thereby totally returned into the cassette. The apparatus is now in the stop mode.

At the front face of the apparatus, there is a row (from left to right) comprising a fast-forward control button 106*a*, a stop control button 106*b*, a video-audio recording control 106*c*, and an audio recording control button 106*d*.

The reel disc device constitutes an essential part of the present invention which will now be described with respect to one embodiment thereof in conjunction with FIG. 4, beginning with a consideration of the organization and operation of the take-up reel disc device 18. This reel disc device 18 comprises, essentially, a reel shaft 110 fixed to the chassis 51 and the reel disc parts as described below held on this reel shaft 110.

The reel disc main structure 22 is fixed to the upper part of a cylindrical bearing sleeve 111 fitted rotatably on the reel shaft 110 and is prevented from separating off from the upper part of the shaft 110. An elastic projection 112 is fixed to the upper part of the reel disc main structure 22. An engagement pin 113 is urged to move upward responsive to the force of a coil spring 115, held at its lower end by a plate 114 fixed to the lower surface of the structure 22. Pin 113 projects a specific length past and above the upper surface of the reel disc main structure 22. The elastic projection 112 and the engagement pin 113 are inserted into the center hole of the take-up reel of a cassette 10 fitted into position in the recording/reproducing apparatus, whereby the reel disc main structure 22 and the take-up reel are coupled.

The first reel disc part 116 has a disc shape and is coaxially fixed onto the bearing sleeve 111, thereby rotating unitarily with the reel disc main structure 22, i.e., the bearing sleeve 111. The reel disc part 116 is encompassed around its outer periphery by a brake shoe 100, on the take-up tension lever 97 and confronting the peripheral surface of the reel disc part 116.

The second reel disc part 117 is disposed coaxially below the first reel part 116. Part 117 has a bearing part of a relatively long dimension fitted around the bearing sleeve 111 in a freely rotatable and slidable manner. The driving roller 43 confronts the outer peripheral surface of this first reel disc part 116. Furthermore, between the reel disc parts 116 and 117, there is interposed a annular first frictional member 118, made of felt. The reel disc part 117 is under an upwardly biasing force, due to a spring member 121 described hereinafter.

The frictional member 118 may be bonded to the reel disc part 117, or it may be simply clamped between the two reel disc parts 116 and 117. In the latter case, the frictional contact surrfaces are so adapted that the coefficient of friction between the upper surface of the frictional member 118 and the surface of the reel disc part 116 is greater than the friction between the lower surface of the frictional member 118 and the surface of the reel disc part 117. By this provision, slippage occurs between the reel disc part 117 and the frictional member 118 when rotation is tranmitted from the reel disc part 117 to the reel disc part 116, as described more fully hereinafter.

The third reel disc part 119 is disposed below the second reel disc part 117 and is fitted on the bearing sleeve 111 in a manner whereby it rotates unitarily with the sleeve 111, but is free to slide axially thereon. A second frictional member 120, of annular shape, is interposed between this third reel disc part 119 and the second reel disc part 117. The reel disc part 119 is urged to move toward the reel disc part 117 responsive to the spring member 121 as described hereinafter. The frictional contact surfaces having a coefficient of friction between the frictional member 120 and the contact surface of the reel disc part 117 which is greater than the coefficient of friction between the frictional member 120 and the contact surface of the reel disc part 119. As a result, a slippage occurs between the reel disc part 119 and the frictional member 120 when rotation is transmitted from the reel disc part 117 to the reel disc part 119.

The above mentioned spring member 121 is retained at the lower surface of its central part by a stop 122 which is fixed to the bearing sleeve 111. A plurality of arms extend radially away from the central part of sleeve 111 and bend upward. The outer ends of these arms contact the lower surface of the reel disc part 119. For this reason, the third reel disc part 119 and the second reel disc part 117, which are axially slidable relative to the bearing sleeve 111, are held under an axial force urging them toward the first reel disc part 116 which is at a fixed height. Thus the two frictional members 118 and 120 are clamped by their respectively adjacent reel disc parts. A pulley 123 for driving a counting mechanism is fixed to the lower end of the bearing sleeve 111.

Next to be described is the operation of the take-up reel disc device 18, of the above described structural organization, for a recording or reproducing mode of operation of the recording/reproducing apparatus. When the recording/reproducing apparatus is changed over to either the recording or reproducing mode, the rotating driving roller 43 is pressed against the outer peripheral surface of the second reel disc part 117 to impart thereto a torque in the tape take-up direction. This torque is not transmitted directly to the bearing sleeve 111 but is transmitted by way of the first frictional member 118 to the first reel disc part 116 and by way of the second frictional member 120 to the third reel disc part 119. Then, the reel disc parts 116 and 119 are respectively adapted to rotate unitarily with the bearing sleeve 111. Sleeve 111 is constructed integrally with the reel disc main structure 22. The torques thus transmitted to the reel disc parts 116 and 119 are mutually superimposed and then transmitted by way of the bearing sleeve 111 to the reel disc main structure 22.

Thus, as described above, the torque or rotational power transmitted to the second reel disc part 117 responsive to the driving roller 43 pressed thereagainst is transmitted simultaneously through a first rotation transmitting path comprising the reel disc 117, the frictional member 118, the reel disc part 116, and the reel disc main structure 22. A second rotation transmitting path comprises the reel disc part 117, the frictional member 120, the reel disc part 119, the bearing sleeve 111, and the reel disc main structure 22 to the reel disc main structure 22.

Then, these first and second rotation transmitting paths are formed mutually parallel. Thus a relatively large torque can be transmitted to the reel disc main structure 22, even when a relatively small force is applied by pressing the reel disc parts against the frictional members 118 and 120. Furthermore, by setting the pressing forces of the frictional members and the reel disc parts at small values, it is possible to suppress the generation of friction heat at the sliding surfaces thereof. Accordingly, the wear of these surfaces can be reduced.

Moreover, in the reel disc device 18 of the above described structural organization, the spring member 121 is compelled to press against the third reel disc part 119. Thus, parts 119 – 121 are adapted to rotate unitarily with the bearing sleeve 111. This arrangement prevents undesirable occurrences, such as wear of the spring and reel disc, generation of noise, and variations in the spring force of the spring, due to a difference in the rotational speeds of the reel disc part and the spring member pressed into contact therewith. These problems occur in conventional reel disc devices.

As a result, a relatively large torque can be transmitted over a long period without fluctuation to the reel disc main structure 22.

In the supply reel disc device 19 as shown in FIG. 4, parts which have the same function as equivalent parts in the take-up reel disc device 18 are designated by the same reference numerals, each with addition of a prime (') symbol. A detailed description of these parts will not be repeated. A first reel disc part 125 and a second reel disc part 126 are adapted to rotate unitarily with a bearing sleeve 111. Around the periphery of the first reel disc part 125, a brake band 37 is provided. A rewind roller 44 is disposed to confront the periphery of the second reel disc part 126.

With the recording/reproducing apparatus in the stopped state shown in FIG. 1, a rewinding control manipulation is carried out. The rewind roller 44 is pressed against the second reel disc part 126, which is thereupon driven in the direction for tape take-up. This rotation of the reel disc part 126 is transmitted through a bearing sleeve 111' as a rotation in the tape take-up direction to a reel disc main structure 23. With the tape 16 completely deposited within the cassette 10, a rewinding operation is carried out.

A cassette 10 for the aforementioned stationary type apparatus contains, in built-in state, a pair of reels each provided with upper and lower reel flanges of respectively different diameters. A sheet of a material such as teflon is provided between the inner wall surface of the cassette housing and the small-diameter flange. On the other hand, a cassette for a portable type apparatus as described hereinafter contains, in built-in state, a pair of reels each having upper and lower reel flanges of the same diameter. For this reason, with respect to the torque in the tape take-up direction to be applied to the take-up reel in the cassette 10 for an apparatus of stationary type, it is necessary to consider separately the torque loss due to friction between the sheet and the roll of tape. Accordingly, it is necessary to apply to the take-up reel of the cassette 10, for a stationary type apparatus, a torque which is greater by the above mentioned torque loss than the torque to be applied to the take-up reel of a cassette for a portable type apparatus. This torque loss becomes of the order of approximately 450 gr-cm. at the start of rotation of a tape roll of maximum diameter. Moreover, the torque loss varies with the size of the tape roll.

For this reason, the recording/reproducing apparatus has universality whereby both kinds of cassettes 10 and 154 can be used interchangeably. It is desirable that a variable torque be imparted to the take-up reel disc in accordance with the type of cassette inserted.

On the other hand, in a conventional recording/reproducing apparatus capable of interchangeably using the above mentioned two types of cassettes, the torque which is suitable for a cassette of a portable type apparatus is applied to the upper reel disc part on the take-up side irrespective of the type of the cassette inserted. For this reason, when a cassette for a stationary type apparatus is used in the above mentioned apparatus to carry out recording or reproducing, winding irregularities tend to occur in the roll of tape formed on the take-up reel.

Another embodiment of a reel disc device in which the above described problem has been solved will now be described in conjunction with FIGS. 5, 6 and 7. Parts which are the same as those in FIG. 1 are designated by like reference numerals, but will not be described again in detail.

The cassette 10 is a cassette for a stationary type apparatus containing a magnetic tape for 60 minutes-recording cassette 10 is emplaced into a specific position on a cassette mounting platform (not shown) by causing a guide groove 10*a* formed in the lower surface of the cassette 10 to engage a pin 130 embeddedly fixed to the platform.

First, the structural organization and operation of the real disc device on the take-up side, constituting an essential part of the present invention, will now be described. A take-up reel disc device 18' has the various reel disc parts described below engaged with a reel shaft 131 fixed to and standing on the chassis 51. A first reel disc part 132 is coaxially fixed to the upper part of the bearing sleeve 133, fitted rotatably on the reel shaft 131. Part 132 comprises, essentially, a reel disc main structure 22 and a disc part 132*a* confronting a brake 100 of a tension servo-mechanism. Screw 134 prevents this reel disc part 132 from separating from the reel shaft 131. An engagement pin projects from the upper surface of part 132 similarly to the preceding embodiment of the reel disc device.

The second reel disc part 135 is provided with a bearing part of relatively long dimension fitted rotatably and slidably around the bearing sleeve 133. This reel disc part 135 is further provided at its outer peripheral part with a driven surface 135*a* which is to be pressed by a driving roller 43 as decsribed before and a gear part 135*b* of smaller diameter than the driven surface 135*a*. Between the first and second dreel disc parts 132 and 135, there is interposed an annular frictional member 136 made of felt. The coefficients of friction between this frictional member 136 and the two real disc parts 132 and 135 are selected so that slippage will occur between the reel disc part 135 and the frictional member 136 when rotation is transmitted from the reel disc part 135 to the reel disc part 132. For this reason, the coefficient of friction between the real disc part 135 and the frictional member 136 does not vary with the adhesive used to band the frictional member 136 to the reel disc part 132.

A fourth reel disc part 137 is fitted rotatably and slidably onto the bearing sleeve 133, similarly as the second reel disc part, and is urged to slide upward by a spring member 141 described hereinafter. Upward movement is limited at a position where engagement part 137*a* contacts the engagement part 135*c* of the reel disc 135. This reel disc part 137 has around its outer periphery a gear part 137*b* of the same diameter and module as the above mentioned gear part 135*b*. If a cassette 10 of large size is emplaced within the apparatus, the rotation of the reel disc part 135 is positively transmitted to the reel disc part 137 by way of a gear 138 meshed simultaneously with the gear parts 135*b* and 137*b* as described hereinafter. The second and fourth reel disc parts 135 and 137, in the case where they rotate unitarily as described above, correspond to the second reel disc part 117 of the take-up reel disc device 18 of the aforedescribed first embodiment.

Figures 5, 7:
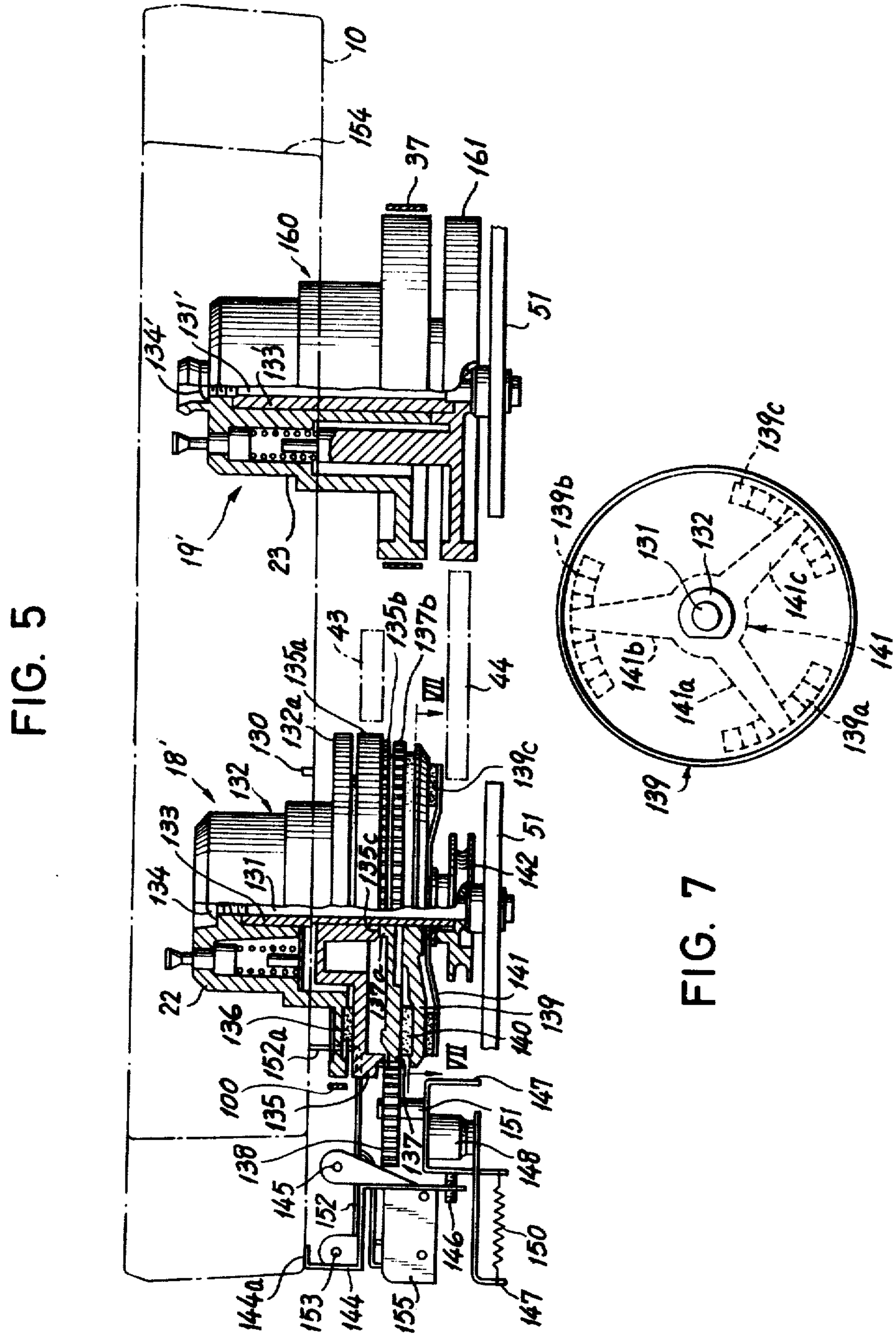
FIGS. 5 and 6 are respectively an elevation view, with a part in vertical section, and a plan view of another embodiment of a reel disc device constituting an essential part of the apparatus of the invention.
FIG. 7 is a plan view in section taken along the line VII—VII in FIG. 5 as viewed in the arrow direction.

A third reel disc part 139 is fitted in engagement with a cut off formed in one part of the side surface of the bearing sleeve 133 as shown in FIG. 7. This reel disc part 139 is axially slidable relative to the bearing sleeve, but rotates unitarily therewith. This reel disc part 139 is urged upward by a spring member 141. An annular frictional member 140 is interposed between these reel disc parts 137 and 139 is clamped therebetween. Then, when the rotation of the fourth reel disc part 137 is transmitted by way of the frictional member 140 to the third reel disc part 139, slippage occurs between the pressing surfaces of the reel disc part 139 and the frictional member 140.

The spring member 141 has a shape comprising a hub-like central portion and arms 141*a*, 141*b*, and 141*c* extending radially outward from the central portion. The central portion is fitted rotatably on the bearing sleeve 133 at a position above a pulley 142 for a counter fixed to the lower part of the bearing sleeve 133. The outer ends of the arms 141*a*, 141*b*, and 141*c* of the spring member 141 are in contact with respective stepped parts of the same height in the stepped projections 139*a*, 139*b*, and 139*c*, respectively. There are different plural numbers of steps with equal angular spacing on the lower surface of the lowest reel disc part 139. Accordingly, while the third, fourth, and second reel disc parts 139, 137 and 135 are being urged upward, they are retained and restricted at a specific height position by the first reel disc part 132.

Next, a detecting mechanism installed in the vicinity of the take-up reel disc device 18' detects the type of a cassette loaded in the apparatus. Its operation will be described. A lever 144 detects the cassette type. The lever has a substantially L-shaped form, as viewed in FIG. 5, and has a bent flange part pivoted on a pin 145. When the cassette 10 is not loaded on the cassette mounting platform, a set screw 146 in the outer end of one arm of this lever 144 is engaged by a lever 147, described hereinafter. The lever 144 is rotated in the clockwise direction as viewed in FIG. 5. A channel-shaped detecting part 144*a* formed on the outer end of the other end of the lever projects outward through an opening in the cassette mounting platform. The detecting part 144*a* is disposed in a position to be engaged by the lower surface near one end of a casette 10 for a stationary type apparatus.

Figure 6:
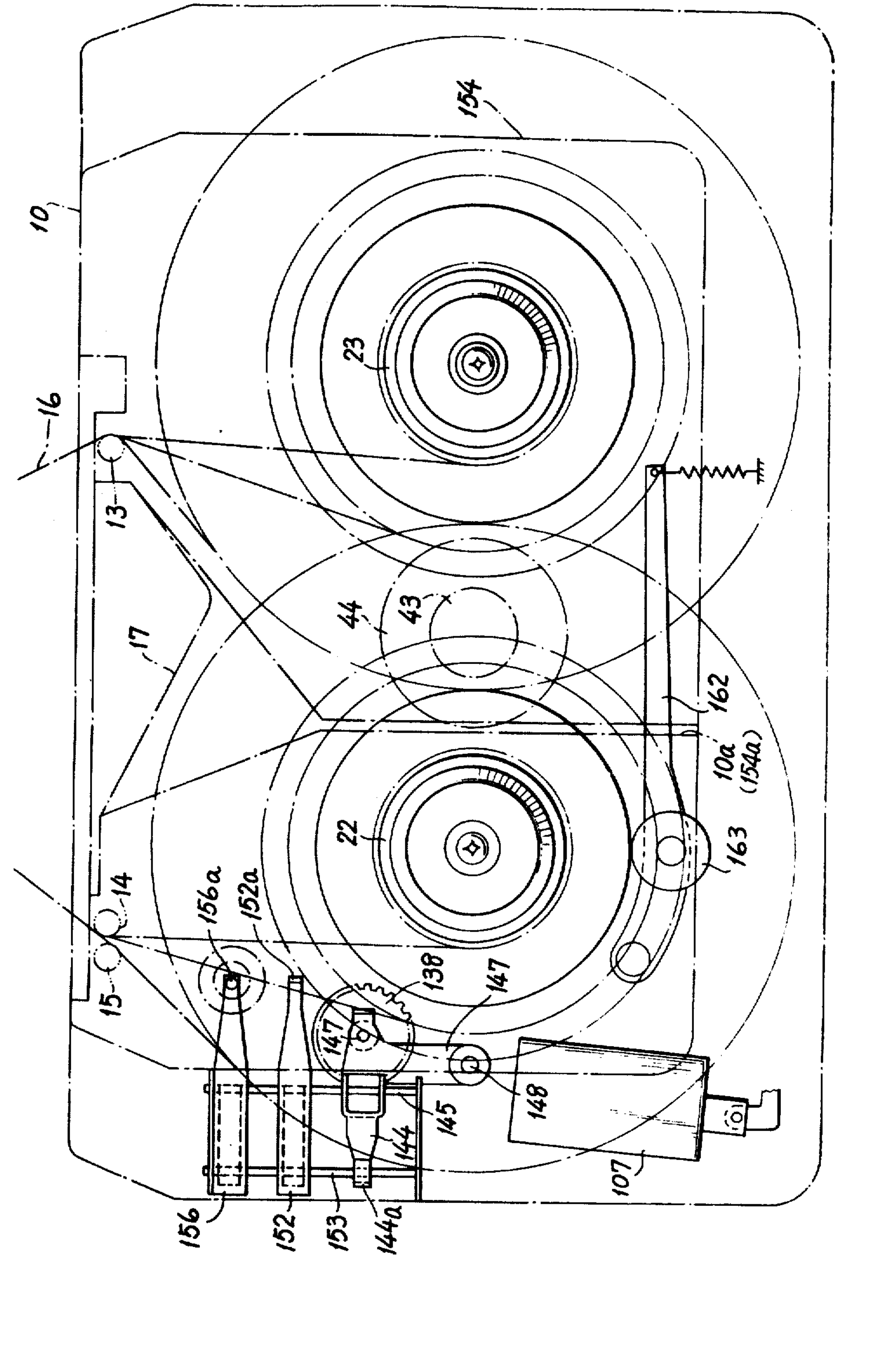

The rotatable lever 147 is pivoted at its base part on a pivot member 148 and is urged to rotate counterclockwise, as viewed in FIG. 6, by a spring 150 stretched from a lever 149. This lever 147 is limited in rotation at a position to which it has turned in the counterclockwise direction, when engaged by the above mentioned set screw 146 contacting the side bent part thereof. In this case, a gear 138 rotatably supported relative to a pin 151 fixed to an end part of the lever 147 is in a position spaced apart from but confronting, the aforementioned. gear parts 135*b* and 137*b*.

A detectng lever 152 for detecting the presence or absence of a loaded cassette is pivoted at one end on a pivot shaft 153. A bent flange part 152*a*, at its opposite end, extends to a position to be engaged by the bottom surface of a cassette 154 for a portable type apparatus. Cassette 154 is of smaller size than the cassette 10 for a stationary type apparatus, and projects out through an opening in the cassette mounting platform. Furthermore, on the lower side of this detecting lever 152, there is a normally open microswitch 155. A detecting lever 156 prevents erasure through error. It is also pivoted on the pivot shaft 153 and supports at its distant end a pin 156*a* fixed thereto pin 156*a* fits into a recess formed in the bottom surfaces of each of the cassettes 10 and 154, thereby to detect the loaded or non-loaded position of a casseette 10 or a cassette 154.

The device of the above described structural organization operates as follows. First, to be described is the operation when a cassette 10 is in inserted position for a stationary type apparatus. When the cassette 10 is inserted into the position indicated in FIG. 5, it is guided by the pin 130 engaged in the groove 10*a* formed in the bottom surface of the cassette. The detecting parts of the detecting levers 152 and 153 are respectively engaged by the bottom surface of the cassette 10. They detect proper insertion of the cassette into position and also whether or not the cassette has completed recording. At the same time, the detecting part 144*a* of the detecting lever 144 projects out of the cassette mounting platform and is engaged by the bottom surface of the cassette 10 near an edge part thereof. The detecting lever 144 is rotated in the counterclockwise direction as viewed in FIG. 5. In addition, the rotatable lever 147 is rotated clockwise (as viewed in FIG. 6) against the force of the spring 150. The aforementioned gear 138 meshes simultaneously with the gear part 135*b* of the reel disc part 135 and the gear part 137*b* of the reel disc part 137. The take-up reel disc device 18' thus assumes its state indicated in FIGS. 5 and 6.

When the recording/reproducing apparatus is placed in the recording or reproducing mode, the driving roller 43 is pressed against the driven surface 135*a* of the reel disc part 135, which thereupon rotates in the tape take-up direction. This rotation of the reel disc part 135 is transmitted by way of the frictional member 136 to the reel disc part 132 and, at the same time, by way of the gear 138 to the reel disc part 137, with the same rotational speed. The rotation of the reel disc part 137 is transmitted by way of the frictional member 140 to the reel disc part 139 and further by way of the bearing sleeve 133, rotating unitarily with the reel disc part 139, to the reel disc part 132.

Thus, the rotation of the reel disc part 135 is driven by the driving roller 43 is transmitted through two parallel transmission paths respectively including clutch mechanisms to be applied as a superimposed or combined torque to the reel disc main structure 22 of integral construction with the reel disc part 132. This is similar to embodiment illustrated in FIG. 4. As a result, a relatively large torque is imparted to the reel disc main structure 22. A tape roll is formed without winding irregularities and without other undesirable occurrences on the take-up reel of the cassette 10 for a stationary type apparatus.

Next to be described is the operation of where a cassette 154 for a portable type apparatus inserted into playing position. When the cassette 154 is inserted into the proper position indicated in FIG. 5, the groove 154*a* in its bottom surface is guided by the pin 130. The detecting parts of the detecting levers 152 and 153 are engaged and actuated by the bottom surface of the cassette 154. However the lever 144 for detecting the type of cassette ius held in its original position. Its detecting part 144*a* is not engaged and actuated. Accordingly, the rotatable lever 147 is in the position to which it has been rotated in the counterclockwise direction as viewed in FIG. 6. The gear 138 is in a position where it is disengaged from the gear parts 135*b* and 137*b*.

When the recording/reproducing apparatus is placed in the recording or reproducing mode, the driving roller 43 is pressed against the driven surface 135*a* of the reel disc part 135, which thereupon rotates in the tape take-up direction, similarly as described above. This rotation of the reel disc part 135 is transmitted by way of the frictional member 136 to the reel disc part 132 and, at the same time, by way of the engagement parts 135*b* and 137*b* mutually pressed together to the reel disc part 137. At this time, the greater portion of the torque for the reel disc part 135 is transmitted by way of the frictional member 136 to the reel disc part 132, and almost no torque is transmitted to the real disc part 137. For this reason, the torque of the reel disc part 135 is transmitted along a single transmission path through the frictional member 136 to the reel disc main structure 22 of integral construction with the reel disc part 132. A relatively small torque is applied to the take-up reel of the cassette 154 for a portable type appartus.

In this connection, different torques are transmitted to reel disc main structure 22 respectively. One case is for the reel disc device of the above described organization and operation, where the gear 138 is meshed with both the gear part 135*b* of the reel disc part 135 and the gear part 137*b* of the reel disc part 137. The other case is where it is not so meshed but is separated from these gear parts 135*b* and 137*b*. This difference will now be considered analytically.

First, the torque $T_1$ for the gear 138 in its operative position, and the torque in the tape take-up direction applied to the reel disc main structure 22 is relatively large and representable by the following equation.

$$T_1 = 2/3\ P_2 r_1 \{(r_{10}^3 - r_{1i}^3 / r_{10}^2 - r_{1i}^2) - (r_{20}^3 - r_{1i}^3 / r_{20}^2 - r_{1i}^2)\} + 4/\pi\ P_1 \mu_2 R \quad (1)$$

The torque $T_2$ applied to the case where the gear 138 is in its inoperated position, and the torque in the tape take-up direction applied to the reel disc main structure 22 is relatively small. Torque $T_2$ is representable by the following equation.

$$T_2 = 2/3\ P_2 \{\mu_1 (r_{10}^3 - r_{1i}^3 / r_{10}^2 - r_{1i}^2) + \mu_3 (r_{30}^3 - r_{3i}^3 / r_{30}^2 - r_{3i}^2)\} + 4/\pi\ P_1 \mu_2 R \quad (2)$$

In these Eqs. (1) and (2):

$r_{1i}$ is the inner radius of the fractional member 136;
$r_{2i}$ is the inner radius of the frictional member 140;
$r_{10}$ is the outer radius of the frictional member 136;
$r_{20}$ is the outer radius of the frictional member 140;
$R$ is the coefficient of friction between the reel disc parts 135 and 137 and the bearing sleeve 133;
$P_1$ is the pressing force of the driving roller 43 against the second reel disc part 135;

$P_2$ is the spring force of the spring member 141;

$\mu_1$ is the coefficent of friction between the frictional member 136 and the reel disc part 135 and that between the frictional member 140 and the reel disc part 137, respectively;

$\mu_2$ is the coefficient of friction between the reel disc part 135 and the bearing sleeve 133 and that between the reel disc part 137 and the bearing sleeve 133 respectively $r_{3i}$ is the frictional inner radius between the contact part 135*c* of the reel disc part 135 and the contact part 137*a* of the reel disc part 137;

$r_{30}$ is the frictional outer radius between the contact part 135*c* and the contact part 137*a*; and $\mu_3$ is the coefficient of friction between the contact parts 135*c* and 137*a*.

When these Eqs. (1) and (2) are compared, it is seen that respective terms thereof are in general correspondence, while the term $$\mu_1\ (r_{20}^3 - r_{2i}^3/r_{20}^2 - r_{2i}^2)$$

of Eq. (1) and the term $$\mu_3\ (r_{30}^3 - r_{3i}^3/r_{30}^2 - r_{3i}^2)$$

of Eq. (2) differ. Then, since and $r_{30} < r_{20}$, in general, the above terms have the following relationship of magnitude.

$$\mu_1(r_{20}^3 - r_{2i}^3/r_{20}^2 - r_{2i}^2) << \mu_3\ (r_{30}^3 - r_{3i}^3/r_{30}^2 - r_{3i}^2)$$

Therefore, the torques $T_1$ and $T_2$ in the tape take-up direction imparted to the reel disc part 132 of the take-up reel disc 18' when the gear 138 is in its operated and unoperated positions, respectively. These torques can be set at will by appropriately selecting the ratio of the outer radius $r_{20}$ of the frictional member 140 and the outer radius $r_{10}$ of the frictional member 136.

In the above described example, the housing or casing of the cassette 154 (e.q., for 15-minute recording) and that of the cassette 10 (e.g., for 60-minute recording) are formed with different shapes. The detecting part 144*a* of the detecting lever 144 is adapted to be engaged only when the larger cassette 10 is inserted into position. However, the following alternative detection method may be used. The casings of the cassette 154 for a portable type apparatus and the cassette 10 for a stationary type apparatus are made the same in shape. A cutout is formed in a part of the cassette 154 corresponding to the detecting part 144*a* of the detecting lever 144, whereby the detecting lever 144 can detect the difference between the two cassettes.

In still another method of detection, all cassettes conform in shape to the cassette 10 for a stationary type apparatus. A cutout is formed in each cassette at its part which confronts the detecting part 144*a* of the detecting lever 144. Then, when a relatively large torque is necessary (as when a quantity of the tape is wound within the cassette), a pin is embedded in the cutout. When a relatively large torque is not necessary, the cutout is left as it is to enable the detecting lever 144 to detect appropriately the type of cassette inserted.

In the above described example, furthermore, the torque of the reel disc part driven by the driving roller can be changed in two stages, and one thereof can be selected. Alternatively, it is also possible to provide a plural number of intermediate reel disc parts corresponding to the reel disc part 137 and a plural number of selecting means corresponding to the gear 138. The torque of the reel disc part 132 imparted by the driving roller 43 is changed in three or more stages, and selective changeover can be made in the torque of a suitable stage among these stages.

In the above described recording/reproducing apparatus of the type capable of alternately using a cassette 10 for a stationary type apparatus and a cassette 154 for a portable type apparatus, it is possible to change the torque imparted to the take-up reel disc device, depending on the type of cassette inserted. Accordingly, if this recording/reproducing apparatus is used for portable purposes utilizing an internally installed power supply it can be used efficiently relative to the tape take-up operation.

The structure and operation of the supply reel disc device and those of the fast-forward mechanism in the above described apparatus will now be described in a simplified manner in conjunction with FIGS. 5 and 6. Parts having the same function as those in the take-up reel disc device 18' are designated by like reference numerals each with the addition of a prime (') designation. These parts will not be described in detail again.

A first reel disc part 160 and a second reel disc part 161 integrally formed with a reel disc main structure 23 are adapted to rotate unitarily with a bearing sleeve 133' rotatably fitted on a reel shaft 131'. The first reel disc part 161 is encompassed by a brake band 37. The second reel disc part 161 is confronted at its periphery by the rewinding roller 44.

A fast-forward lever 162 is turned in the counterclockwise direction as viewed in FIG. 6, counter to the force of a spring by a fast-forward control actuation. A fast-forward roller 163 is rotatably held on this lever 162 and rotating in the clockwise direction is pressed simultaneously against the outer peripheral surfaces of the first and second reel disc part 132 and 135 of the take-up reel disc device 18' as shown in FIG. 6. Consequently, a torque in the tape take-up direction is imparted to the reel disc main structure 22. Fast-forward operation is carried out with the magnetic tape 16 in a deposited state, within the cassette 10 or 154.

Further, this invention is not limited to these embodiments but various variations and modifications may be made without departing from the scope and spirit of the invention.

What I claim is:

1. A recording and/or reproducing apparatus having a reel disc device comprising:

a reel disc main structure for engaging and rotating a reel in a direction to take up a tape-form recording medium;

a first reel disc part disposed below said reel disc main structure and adapted to rotate unitarily therewith;

a shaft-form member rotatable unitarily with the reel disc main structure and said first reel disc part;

a second reel disc part disposed below the first reel disc part and fitted onto said shaft-form member in a manner to rotate separately therefrom;

a third reel disc part disposed below said second reel disc part and rotating unitarily with the shaft-form member;

a fourth reel disc part disposed between second and third reel disc parts and fitted onto the shaft-form member in a manner to be rotatable separately from the shaft-form member and the second reel disc part;

driving means for transmitting rotational power to the second reel disc part;

coupling means operating, when in operative state, to couple the fourth and second reel disc parts for unitary rotation thereof and, when in inoperative state, to uncouple said reel disc parts;

first rotation transmitting means interposed between the first and second reel disc parts to transmit the rotation of the second reel disc part to the first reel disc part; and second rotation transmitting means interposed between the fourth and third reel disc parts to transmit the rotation of the fourth reel disc part to the third reel disc part, said second reel disc part, said first rotation transmitting means, and said first reel disc part forming a single first rotation transmission path from the driving means to the reel disc main structure, the rotation of said driving means being transmitted with a small torque from the second reel disc part by way of only said first transmission path when said coupling means is in the inoperative state, said second reel disc part, said fourth reel disc part, said second rotation transmitting means, said third reel disc means, and said shaft-form member forming a second rotation transmission path from the driving means to the reel disc main structure, in addition to said first rotation transmission path, when the coupling means is in the operative state, whereby the rotation of the driving means is transmitted from the second reel disc part simultaneously by way of the first and second transmission paths with a large torque to the reel disc main structure.

2. A recording and/or reproducing apparatus having a reel disc device as set forth in claim 1 which further comprises changeover means for displacing the coupling means selectively between its inoperative state position separated from the second and fourth reel disc parts and its operative state position at which the coupling means couples the second and fourth reel disc parts to cause the same to rotate unitarily.

3. A recording and/or reproducing apparatus having a reel disc device as set forth in claim 1 in which said apparatus is capable of selectively accommodating for use tape storing casings of different shape and containing said reel, and which said apparatus further has detection means for detecting the tape storing casings of predetermined kinds on the basis of differences in the shapes of storing casings inserted and thus accommodated and means operating in accordance with the detecting operation of said detection means to changing the coupling means from its inoperative state to its operative state.

4. A recording and/or reproducing apparatus having a reel disc device as set forth in claim 1 in which said second reel disc part has a first gear part formed around the entire outer peripheral part thereof, said fourth reel disc part has a second gear part formed around the entire outer peripheral part thereof, and said coupling means comprises a rotation transmitting gear moving into the operative position to mesh simultaneously with said first and second gear parts and thereby to cause the fourth reel disc part to rotate unitarily with the second reel disc part.

* * * * *